May 19, 1964 H. A. MARTENS 3,133,456
TOOL DETECTOR

Filed March 7, 1960 4 Sheets-Sheet 1

INVENTOR.
Herbert A. Martens
BY
Harness, Dickey & Pierce
ATTORNEYS

United States Patent Office 3,133,456
Patented May 19, 1964

3,133,456
TOOL DETECTOR
Herbert A. Martens, Birmingham, Mich., assignor to The Cross Company, Fraser, Mich., a corporation of Michigan
Filed Mar. 7, 1960, Ser. No. 13,353
41 Claims. (Cl. 77—5)

This invention relates to tool detectors and more particularly to equipment for association with a machine tool for producing an indication when the cutting tool forming a part of that machine is of improper length or is broken.

This invention is a continuation-in-part of the application of Ralph E. Cross and Herbert A. Martens, Serial No. 781,089, filed December 17, 1958, issued as Patent No. 3,025,728, dated March 20, 1962, entitled "Tool Detector," and the disclosure thereof is incorporated by reference herein.

The principles of the invention are advantageously applied to automatic machine tools in which cutting operations are repetitively formed on a series of workpieces in an automatic manner and without close and constant supervision by an operator. It has been found, in such machines, that tool breakage is a major factor among the causes leading to machine down-time. Equipment such as that disclosed in United States Patent No. 2,679,038 granted May 18, 1954, to R. E. Cross et al., can be utilized to reduce this down-time by reducing the incidence of tool breakage, that equipment serving to shut down the machine whenever any one of the cutting tools thereof has performed a number of operations indicative that tool damage or breakage is likely to occur if the cutting tool is not replaced. While the equipment, in practice, has measurably reduced the extent of the tool breakage and the extent of down-time, some tool breakage may still occur due, for example, to unusual work loads being imposed upon the tool (as, for example, hard spots in the workpieces) or to defective tools. Further, while the provision of means for pre-setting the tools to length noted in the above-identified patent tends to ensure that the tools will be set to proper length, it is not impossible for an operator to improperly set the tools, and particularly it is not impossible for the operator to set the tools too short. The equipment disclosed in the noted patent will not produce a signal or shut down the machine if the cutting tool is of improper length due to improper setting or due to breakage.

Improperly set or broken tools will normally produce defective workpieces, and in an automatic operation a series of defective workpieces may be produced before the condition is discovered. Accordingly, an object of the present invention is to provide means for producing a signal or output indication or to shut down the machine tool if any one of the cutting tools forming a part thereof is of improper length or broken.

The principles of the invention have been representatively disclosed in conjunction with a machine tool for drilling one or more holes in a workpiece. The machine tool includes a base and a head supported upon and moveable with respect to the base. The head includes one or more cutting tools which are carried by the head from a position spaced from the workpiece to a position in which the cutting tools are in cutting engagement with the workpiece. A sensing means for each cutting tool is disposed in the path of travel of that cutting tool so as to be disposed in sensing relationship with portions of the cutting tool during all or a part of the travel of the cutting tool between the noted positions. In the preferred arrangement, this sensing means comprises an inductor in the form of a coil of wire positioned between the head and the workpiece and positioned so that each proper length and unbroken cutting tool will occupy a position in which its effective length can be sensed by the coil in at least one point in its range of travel. While the sensing coil may be supported in any suitable fashion, in the illustrated arrangement it is mounted upon a bushing plate which is positioned proximate the workpiece and which further serves or may serve the function of guiding of guiding the drills. In some machine tools, such bushing plates are fixed in a position adjacent the transfer device or conveyor system which advances the workpieces successively into position for drilling, while in other machines, the bushing plate is movable toward and away from the workpiece for various reasons, such as for establishing clearances preliminary to indexing the workpiece. The subject sensing means can be associated with either of these types of bushing plates.

The inductance coil is disclosed as constituting an element of an oscillatory circuit forming a part of a control means which serves, when placed in operation, to produce different indications in accordance with whether any portion of the cutting tool is or is not in a position to be sensed by the coil at that time. In one arrangement, the cutting tools never leave the respective sensing coils as long as they are unbroken and of proper length. In another arrangement, the cutting tools always leave the sensing coils at some point in the travel of the head and re-enter the sensing coils during the forward movement of the head, with all cutting tools entering their respective sensing coils concurrently. In a still further arrangement, the times at which the several cutting tools move into sensing relationship with the sensing coils differ among the several cutting tools, or among several groups of cutting tools.

This invention relates to improved means for sensing the condition of a plurality of cutting tools through the use of equipment common to the several cutting tools, and more particularly to improved sensing and control arrangements in which a single sensing equipment including an oscillatory circuit is provided individually to each of a plurality of cutting tools and in which equipment common to the several oscillatory circuits serves to produce an output indication if any one of the oscillatory circuits produces an indication that the tool associated therewith is defective.

A more detailed understanding of the principles of the invention may be obtained from the following detailed description of embodiments of the invention when read with reference to the accompanying drawings, in which:

FIG. 8 is a schematic representation of a control equipment for use with a plurality of cutting tools and constituting, as an example, a circuit representation of certain of the circuit elements illustrated in FIG. 7, and FIG. 9 is a schematic representation of a modification of the circuit of FIG. 8.

Figure 1:
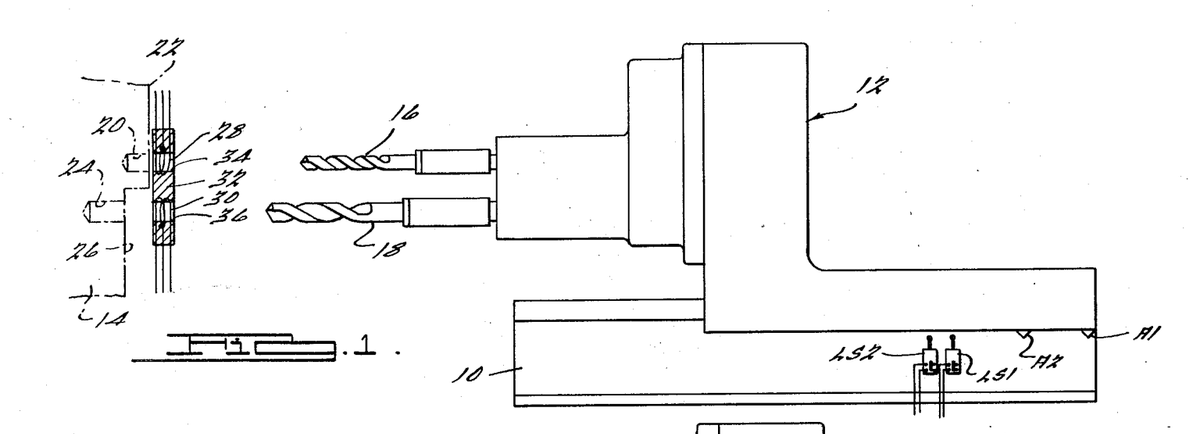
FIGURE 1 is a side elevational view of a machine tool in association with a cutting tool sensing means and with means for detecting a critical position of the machine tool head with respect to the base, the head being shown in a retracted position.
Figure 2:
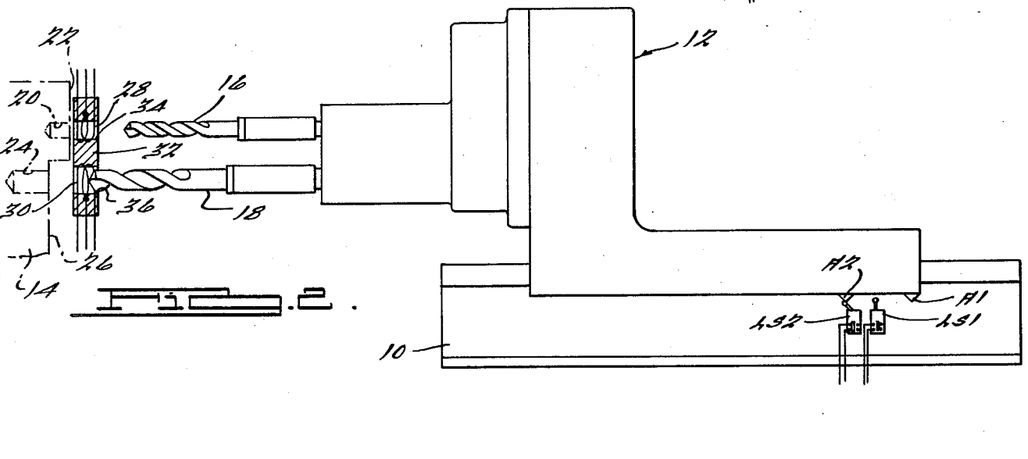
FIG. 2 is a view of the machine of FIG. 1 with the head being shown in an intermediate position of advance at which sensing of the condition of the cutting tool can appropriately occur.

Elements of a representative machine tool which are significant to the practice of the principles of the present invention are illustrated in FIGS. 1 and 2 of the drawings. The machine tool there shown comprises a base 10 slidably supporting a head 12 for movement in translation toward and away from a workpiece 14. The head 12 carries a plurality of cutting tools representatively illustrated as drills 16 and 18 which, in the normal manner, are mounted in individual spindles for individual rotation relative to the workpiece 14. In the illustrated arrangement, drill 16 is adapted to drill a hole 20 in a face 22 of the workpiece 14 while drill 18 is adapted to drill a larger diameter hole 24 in an offset face 26 of the workpiece 14. The nature of these cutting tools and their relationship to the workpiece are, of course, purely representative.

An inductance coil 28, preferably annular in configuration and having a central aperture larger in diameter than drill 16, is mounted adjacent workpiece 14 coaxially with the drill 16, and an inductance coil 30 is similarly associated with drill 18. Inductance coils 28 and 30 are supported by a member 32 which is normally fixed in position relative to the workpiece 14 and relative to the base 10. Member 32 is provided with apertures 34 and 36 adapted to accept drills 16 and 18 respectively. Member 32 may be made of insulating material with the inductance coils 28 and 30 being embedded in the walls of the apertures 34 and 36 or those inductance coils may be wound about individual bobbins which are mounted as inserts in the member 32. It is preferred that no ferrous element be interposed the coils and the drills when the drills are within the apertures 34 and 36.

In many machine tools of this nature, a bushing plate is mounted proximate the workpiece which serves to guide and support the drills. It is contemplated that the inductance coils 28 and 30 be mounted upon bobbins which serve as the bushing elements of such a bushing plate. In certain such equipment, the bushing plate is moved relative to the workpiece preliminary to or as an incident of the drilling operation, particularly in circumstances where the surface of the workpiece which is to be drilled is recessed relative to other surfaces of the workpiece. In those cases, in order to position the bushing plate close to the surface to be drilled while yet insuring that the bushing plate does not interfere with movement of the workpiece to and from the work station, it is necessary to move the bushing plate towards the workpiece preliminary to or during the drilling operation. The features of the present invention can be applied to such an arrangement, the only requirement (in this embodiment) being that the tips of the drills be moved into proper sensing relationship with the sensing coils at some point during their travel into engagement with the workpiece and that the positional relationship between the bushing plate and the base be consistent from operation to operation at the instants that the tips of the cutting tools enter the bushing plate. This requirement is met, of course, by an arrangement in which the tips of the drills are in proper sensing relationship with the sensing coils at the fully retracted position of the head.

In the view of FIG. 1, the head 12 is withdrawn so that the drills 16 and 18 are spaced from the workpiece 14 and from the member 32. After the workpiece is in position, the head 12 is advanced toward the workpiece. During the course of this movement, the longer of the two illustrated drills 18 will enter the aperture 36 and come into sensing relationship with the inductance coil 30. This condition in the advance of the head toward the workpiece is illustrated in FIG. 2 of the drawings. As the head continues to advance, the point will be reached at which the drill 16 enters the aperture 34 and comes into sensing relationship with the inductance coil 28. As the head advances further, the drills are brought into cutting engagement with the workpiece 14 and form the holes 20 and 24.

The inductance coils 28 and 30 are, in the illustrated arrangement, air core inductors. Since the cutting tools 16 and 18 have an iron content, they will serve as elements of the flux-return paths as they enter the inductance coils so as to modify the reluctance of the flux-return paths and the effective inductance of those coils. As a result, the effective inductance of the coils 28 and 30 will be different when no tool is in sensing relationship therewith than it is when the iron-containing tools are disposed therewithin. This change in inductance is sensed by equipment to be described to provide an indication as to whether, at any selected time, a cutting tool is or is not disposed in sensing relationship with the inductance coils.

As noted, the tip of each of the cutting tools enters the associated aperture in the member 32 and comes into sensing relationship with the individual coil 28 or 30 at one point in the travel of the tool toward the workpiece. It is at this region that the sensing operation is preferably performed, for if the tool has advanced further toward the workpiece, an indication that a portion of the cutting tool is in sensing relation with the sensing coil would not necessarily preclude the possibility that the extreme tip of the tool was broken or was of improper length. Consequently, the equipment is arranged so that if it is to be determined whether the cutting tool is set short or broken, the sensing operation occurs at the instant that the tip of a correct length, unbroken cutting tool reaches sensing relationship with the sensing coil. Drill 18 is shown in this position in FIG. 2 of the drawings. This condition exists, with proper length, unbroken cutting tools, at a fixed position of the head 12 in its movement toward the workpiece. Therefore, the sensing operation can be initiated under the control of the position of the head 12 relative to the base 10, the arrival of the head 12 in a pre-selected positional relationship with respect to the base 10 being detected by means associated with both the head and the base. This means, in the embodiment of FIGS. 1 and 2, takes the form of one or more limit switches and cooperating actuators.

In the illustrated arrangement, limit switches LS1 and LS2 are mounted upon the base 10 and cooperating actuators A1 and A2 are secured to and are moved by the head 12. Limit switch LS1 and its actuator A1 are individual to the drill 16, while limit switch LS2 and its actuator A2 are individual to the drill 18. The actuating levers of the limit switches LS1 and LS2 are offset from one another in a horizontal sense and transversely of the machine, and the actuators or dogs A1 and A2 are correspondingly offset so that actuator A2 will not engage or actuate limit switch LS1 and so that actuator A1 will not engage or actuate limit switch LS2.

Since drill 18 is illustrated to be longer than drill 16, limit switch LS2 should appropriately be actuated before limit switch LS1. As the head 12 moves from the FIG. 1 position to the FIG. 2 position, actuator A2 is moved with the head into actuating relationship with the lever of limit switch LS2 producing, in the illustrated arrangement, a closure of those limit switch contacts. Limit switch LS2 and actuator A2 are adjusted so that this contact closure occurs at the instant and position that the tip of a proper length and unbroken drill 18 is just entering sensible relationship with coil 30. As a result, the control means including the sensing coil will detect the presence of the metallic drill within the coil and will not transmit a trouble indication.

As the head 12 advances further to the left from the FIG. 2 position, limit switch LS2 will be released, and at a still further position of advance, actuator A1 will trip limit switch LS1 to produce closure of its contacts. Limit switch LS1 and actuator A1 are adjusted so that this contact closure occurs just as the tip of a proper length and unbroken drill 16 enters sensible relationship with coil 28, and again there will be no trouble indication transmitted. As the head 12 advances still further to the left from the FIG. 2 position, limit switch LS1 is released.

In the above discussed arrangement, one head position detecting means is provided for each of the two shown cutting tools. If both cutting tools are the same length, it is possible to utilize but one head position detecting means. Thus, as an example, if tools 16 and 18 in FIG. 1 of the drawings were of equal length, then both limit switches LS1 and LS2 would properly be at the same positions and, accordingly, one limit switch would suffice. If the cutting tools are of different lengths, a single head position detecting means may be employed if the tool sensing coils are staggered axially from the workpiece in accordance with the differences in the length of the two cutting tools. As an example, in the showing of FIG. 1, a stepped bushing plate 32 could be provided so that sensing coil 28 is at a different axial position than sensing coil 30, with the distance between the tip of drill 16 and the coil 28 being equal to the distance between the tool 18 and its individual coil 30.

Figures 3, 5:
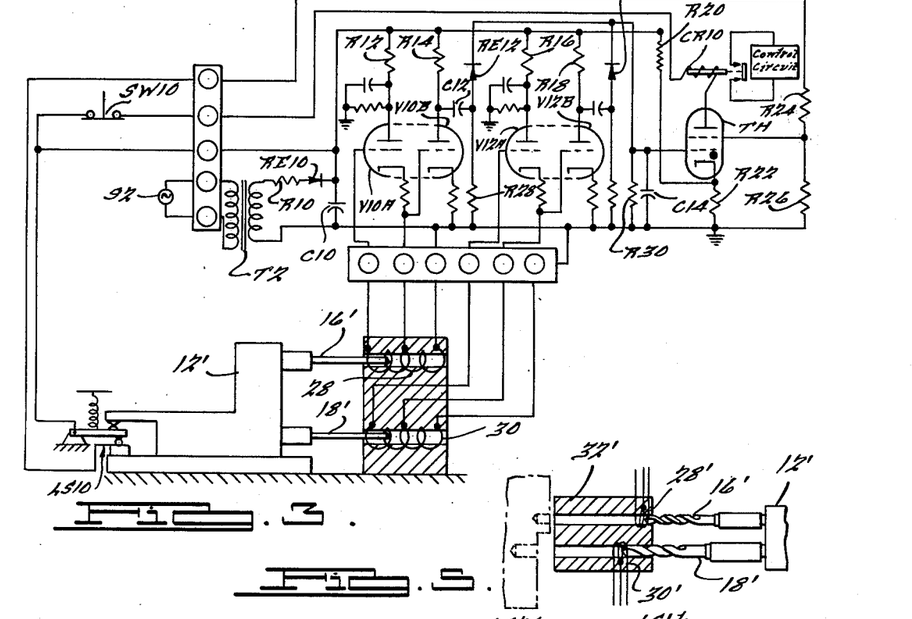
FIG. 3 is a schematic representation of a control equipment for use with a plurality of cutting tools.
FIG. 5 is a fragmentary view of a modification of FIG. 1 in which the sensing coils are in continuous sensing relation with cutting tools of correct length.

The control equipment illustrated in FIG. 3 is intended for use with two cutting tools so arranged in association with their individual sensing coils that both cutting tools, if both are unbroken and of proper length, enter their respective sensing coils concurrently. Consequently, but one limit switch, identified as LS10, is illustrated in FIG. 3 of the drawings. This limit switch is a counterpart of limit switch LS1 or LS2 in FIGS. 1 and 2 of the drawings, but is located at the point at which both cutting tools just enter their respective sensing coils.

In the circuit of FIG. 3, D.C. power is derived from the power supply including transformer T2, the primary winding of which is connected (such as through suitable switching means) to a source of alternating voltage S2. The alternating voltage appearing across the secondary winding of transformer T2 is applied through a current limiting resistor R10, half-wave rectified by means of rectifier RE10 and filtered by means of capacitor C10. The direct voltage appearing between the upper terminal of capacitor C10 and ground is applied through load resistor R12 of triode V10A, through load resistor R14 to the anode of triode V10B, through load resistor R16 to the anode of triode V12A, through load resistor R18 to the anode of triode V12B, and to ground through voltage divider resistors R20 and R22, the positive direct voltage appearing at the upper terminal of resistor R22 being applied to the cathode of thyratron TH.

The direct voltage appearing between the upper terminal of capacitor C10 and ground is also applied through the normally closed reset switch SW10 and through the winding of relay CR10 to the anode of thyratron TH. The positive direct voltage appearing across the capacitor C10 is also applied across the circuit including the electrical contacts of limit switch LS10, resistor R24 and resistor R26. The positive direct voltage appearing at the upper terminal of resistor R26 when the contacts of limit switch LS10 are closed is applied to the second control electrode of thyratron TH.

Vacuum tube V10A forms a part of an oscillatory circuit also including coil 28 and the capacitance of the leads interconnecting coil 28 and tube V10A (although lumped capacitance could be utilized to obtain a selected oscillatory frequency if desired), while vacuum tube V12A forms a part of an oscillatory circuit also including coil 30 and the capacitance of the conductors interconnecting coil 30 and the vacuum tube. These circuits are connected as Hartley oscillators. Coil 28 is individual to drill 16' and coil 30 is individual to drill 18', both of which are carried by head 12' and both of which are counter-parts of drills 16 and 18 in FIGS. 1 and 2, except that, for the above noted purposes, they are assumed to be equal in length.

Whenever drill 16' is separated from coil 28, the oscillatory circuit including coil 28 and vacuum tube V10A breaks into oscillation. The oscillatory signal is directly coupled to vacuum tube V10B, and the resulting amplified alternating voltage is applied through capacitor C12 and developed across resistor R28. The voltage across resistor R28 is half-wave rectified by means of rectifier RE12 and the resulting unidirectional voltage is developed across resistor R30 which is shunted by filter capacitor C14. The voltage appearing across resistor R30 and capacitor C14 is applied to the first control grid of thyratron TH. Rectifier RE12 is poled so that this voltage is positive relative to ground.

Thyratron TH acts as a coincidence circuit, requiring the concurrent application of appropriate direct voltages to both of the control electrodes thereof before the thyratron will fire. If limit switch LS10 is open, no direct voltage will be applied to the second control electrode of the thyratron and the thyratron will not fire even though the noted direct voltage signal is applied to the first control electrode thereof. However, if limit switch LS10 is closed at the time this direct voltage signal is applied to the first control electrode, thyratron TH will conduct and operate relay CR10. Relay CR10 is provided with a set of normally open contacts adapted to be connected in series with a machine control circuit to, for example, illuminate a warning light and, if desired, shut down the operation of the machine.

In a similar manner, the oscillatory circuit including vacuum tube V12A and coil 30 will break into oscillation whenever no portion of tool 18' is disposed in proper relation with that coil, and the oscillatory signal will be amplified and rectified to produce a positive direct voltage at the first control electrode of thyratron TH, causing that thyratron to fire if, at that instant, limit switch LS10 is closed. It may be noted that the oscillatory circuit could be designed to be normally oscillatory and to block if a tool is present within the sensing coil, or the circuit could be continuously oscillatory, with the amplitude or frequency of the output signal changing if no tool is present within the sensing coil. The important consideration is that some characteristic of the operation of the oscillatory circuit should change if the tool is withdrawn from the coil.

Figure 4:
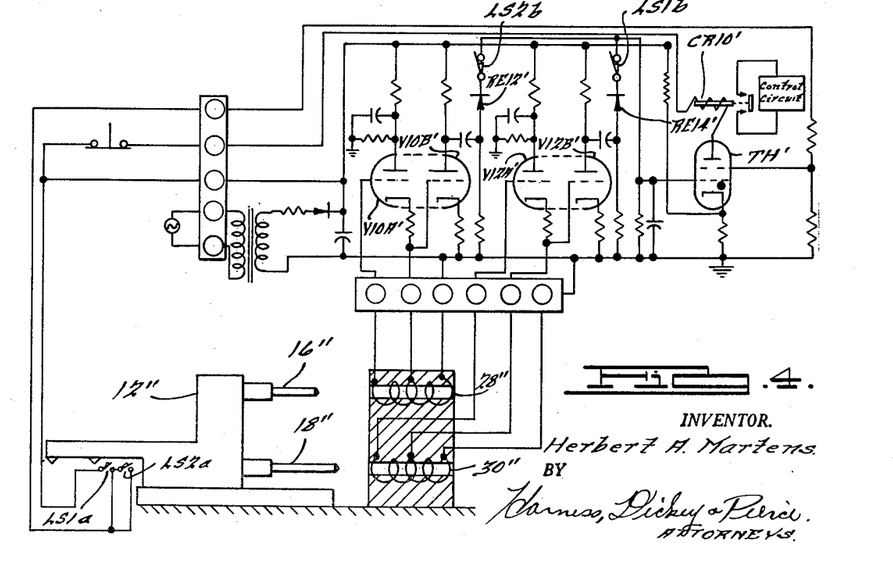
FIG. 4 is a schematic representation of a modification of the arrangement of FIG. 3.
Figures 4, 6:
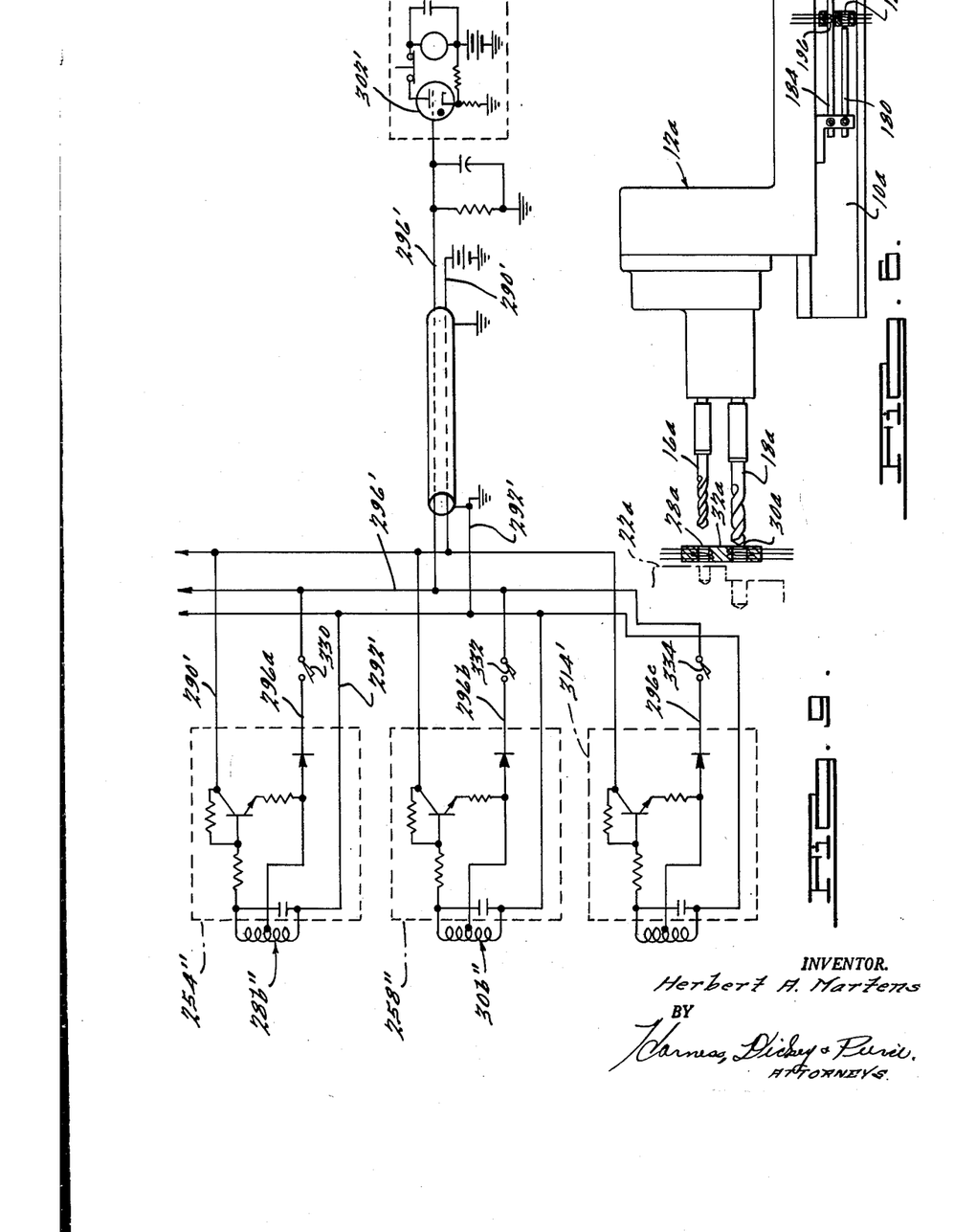
FIG. 6 is a side elevational view of a modified form of the machine tool of FIG. 1.

If the points at which the two cutting tools enter their respective sensing coils do not concur in time and position, that is, if an arrangement similar to FIGS. 1 and 2 is employed in which two separate head position detecting means are utilized to detect the individual times at which the two illustrated cutting tools enter their respective sensing coils, two circuits similar to FIG. 3 may be provided, or preferably, the circuit of FIG. 3 is modified to still gain advantage of the use of a single output circuit or thyratron in conjunction with a plurality of oscillatory circuits, as is illustrated in FIG. 4. In that arrangement, which is like the circuit of FIG. 3, except as noted, the normally open contacts of the two limit switches LS1 and LS2 (FIGS. 1 and 2) should be connected in parallel across the two control leads. This is illustrated in FIG. 4, in which the normally open contacts of limit switches LS1 and LS2 have been labeled LS1a and LS2a. In this fashion, the closure of the normally open contacts of either limit switch LS1 or limit switch LS2 will result in the application of an enabling direct voltage to the second control electrode of thyratron TH'.

Since the closure of either of the normally open limit switch contacts LS1a or LS2a will enable thyratron TH', means must be provided for selectively enabling and disabling the two illustrated oscillatory circuits to apply a firing signal to the thyratron. In the arrangement illustrated in FIG. 4 of the drawings, the two oscillatory circuits are normally enabled, but the oscillatory circuit including tube V10A associated with coil 28 and hence with tool 16 is disabled to transmit a firing signal when, but only when, limit switch LS2, individual to tool 18", is actuated to prevent the oscillatory circuit including coil 28 from improperly operating thyratron TH, and similarly, the oscillatory circuit including tube V12A and coil 30″ is normally enabled but is disabled when, but only when, limit switch LS1, individual to tool 16″, is actuated. This is accomplished by placing a normally closed contact of limit switch LS2, labeled contact LS2b, in series with and adjacent rectifier RE12′, and by placing a normally closed contact of limit switch LS1, labeled contact LS1b, in series with and adjacent rectifier RE14′. In operation, when the normally open limit switch contacts LS1a are closed to enable thyratron TH′, the oscillatory circuit individual to tool 16″ and including coil 28″ remains enabled but the opening of limit switch contacts LS1b at this time disables the oscillatory circuit including tube V12A′ and coil 30″ to influence thyratron TH′. Consequently, thyratron TH′ will be fired if, but only if, tool 16″ is not at that instant in sensing relationship with coil 28″. Similarly, when limit switch LS1 is released during the forward motion of head 12″, limit switch contacts LS1b again close to enable the oscillatory circuit including coil 30″, but contacts LS1a open to disable the thyratron TH′. During the further movement of the head 12″, limit switch LS2 will be actuated to close its contacts LS2a and open its contacts LS2b. The closure of contacts LS2a enables the thyratron TH′, while the opening of contacts LS2b disables the oscillatory circuit including coil 28″ to effect, at that time, the operation of thyratron TH′.

It will be apparent that the oscillatory circuits may be normally disabled to influence the operation of thyratron TH and may be enabled to do so only in response to the actuation of the respective limit switches. This would be accomplished by converting limit switch contacts LS2b to a normally open pair of contacts of limit switch LS1 and by converting the limit switch contacts LS1b illustrated in FIG. 4 into a pair of normally open contacts of limit switch LS2.

FIG. 5 illustrates an arrangement in which the member 32′ is stationary relative to the workpiece and supports coils 28′ and 30′ therewithin in appropriate positions so that normal length and unbroken tools 16′ and 18′ are just positioned within the coils 28′ and 30′, respectively, when the head 12′ is fully retracted. Either the head 12′ or the member 32′ should be movable from the operational relationship shown to a position in which the tools can be replaced.

With such an arrangement, normal length and unbroken cutting tools will never leave the coils 28′ and 30′, so that the control means can be continuously energized and continuously enabled. A trouble indication will not be produced until, at some time, a portion of one of the drills is not disposed within one of the two sensing coils. This will occur only if the tool is missing, too short, or broken. The circuit of FIG. 3 may be simplified to operate in this fashion by simply connecting a jumper across the electrical contacts of limit switch LS10 so as to short out that limit switch, that is, limit switch LS10 need not be provided and the two conductors connected thereto may be simply interconnected.

Figures 6, 7:
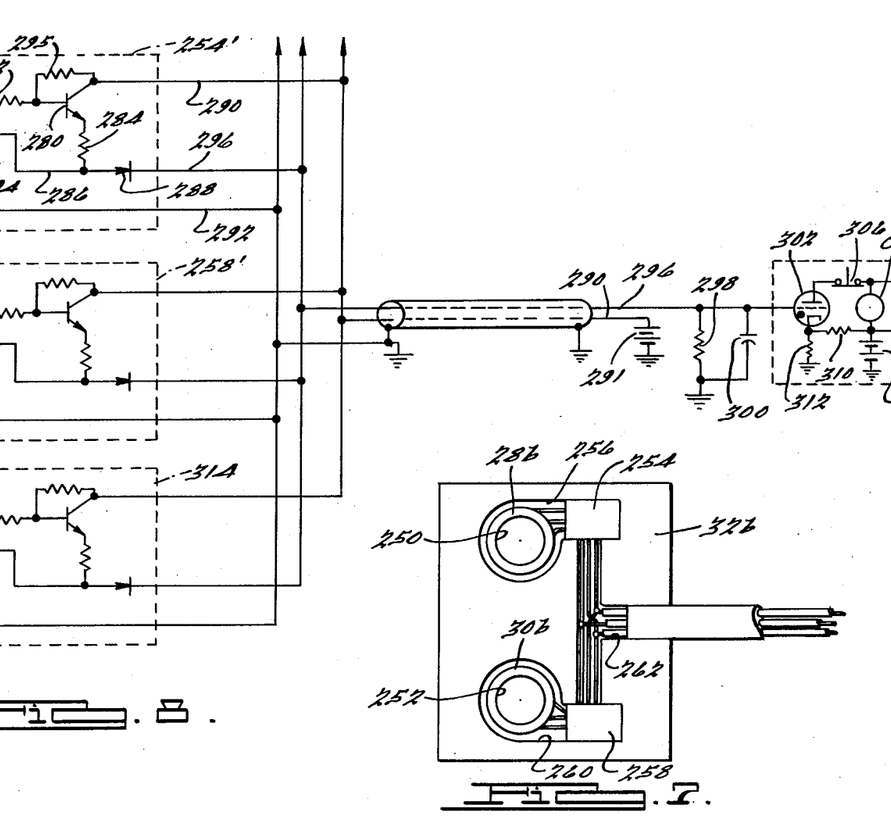
FIG. 7 is a partially cut away front elevational view of a sensing system structure for association with a pair of cutting tools.

It will be appreciated that the particular head position detecting means illustrated is but representative of various types that may be employed. For example, in the above identified application of Ralph E. Cross and Herbert A. Martens, further means are illustrated in the form of a variable inductance unit. In that arrangement as illustrated in FIG. 7, a metallic rod 180 is supported upon the head 12a having its axis parallel with the line of movement of that head. A sensing coil 182 is mounted coaxially with that rod upon the base 10a. That head position sensing coil 182 is electrically connected in parallel with the sensing coil 28a and is so positioned that its rod 180 will just leave sensing relation with the head position sensing coil at the instant that a correct length and proper tool 16a is just entering coil 28a. If the two tools 16a and 18a enter sensing relation with their respective sensing coils at different times, then an additional rod 184 and coil 186 should be provided upon the head and base arranged to move from sensing relationship at the same instant that tool 18a moves into sensing relationship with its respective sensing coil 30a. The circuit of FIG. 3 may be used in conjunction with such an arrangement simply by jumpering limit switch LS10, it being recognized, as above suggested, that the circuit would be modified by having the head position detecting coils 182 and 186 connected in parallel with the coils 28a and 30a, respectively.

FIG. 7 shows a structural arrangement in which the oscillatory circuits are physically disposed in close proximity to the sensing coils with which they are associated. In that arrangement, a sensing coil 28b is embedded in or disposed in a cavity in an insulating member 32b and surrounding an aperture 250 therein through which the cutting tool to be sensed can project, and a sensing coil 30b is similarly embedded or disposed in a cavity in insulating member 32b closely surrounding an aperture 252 through which a different cutting tool, the condition of which is to be sensed, may pass. Sensing coil 28b is an element of an oscillatory circuit also including other elements 254 embedded in or disposed in a cavity 256 in the member 32b and sensing coil 30b forms an element of an oscillatory circuit also including elements 258 embedded or disposed in a cavity 260 in member 32b. The conductors connected to elements 254 and 258 may be embedded in or passed through a cavity 262 in member 32b, as illustrated. Member 32b may have the characteristics above discussed in connection with member 32 in FIG. 1, that is, it may, for example, be mounted on or serve as the bushing plate.

While it is possible to use vacuum tube circuits for the elements 254 and 258 in FIG. 7 of the drawings, it is presently preferred to transistorize this circuitry, as is illustrated in FIG. 8.

The elements 254 of FIG. 7 are representatively illustrated as elements 254′ in FIG. 8 and the elements 258 of FIG. 7 are similarly represented as elements 258′ in FIG. 8. Elements 254′ comprise a transistor oscillator of the Hartley type. The base of the transistor 280 is connected through resistor 282 to the upper end of the coil 28b′, the emitter of transistor 280 is connected through resistor 284 to conductor 286 which is connected to the center tap of the coil 28b′, that is to the junction of the two coil portions, and is also connected to diode 288, and the collector of transistor 280 is connected to a source of positive potential 291 on conductor 290. The lower end of the coil 28b′ is connected to a source of ground potential on conductor 292 and the oscillatory circuit is completed by capacitor 294 connected across the coil pair 28b′ and a feed-back connection including resistor 295 between the collector and base of transistor 280. Since the leads between the elements 254′ and the sensing coil 28b′ are intentionally short, it is desirable, although not always imperative, that a lumped capacitance such as capacitor 294 be provided.

The oscillatory circuit is normally quiescent and will break into oscillation only if, during the time of sensing, no tool is disposed within the sensing coil 28b′. If this occurs, the circuit breaks into oscillation developing an alternating voltage between conductors 286 and 292 which is rectified by rectifier 288. The resultant positive direct voltage appearing between conductors 286 and 292 is filtered by means of resistor 298 and capacitor 300 and applied to the control grid of a thyratron 302. The anode of thyratron 302 is connected to a source of anode voltage 304 through a switch 306 and the winding of control relay CR20 (which is paralleled by a capacitor 308). The cathode of thyratron 302 is raised to a positive potential by means of the voltage divider network including resistors 310 and 312 connected between the source of potential 304 and ground, with the cathode of thyratron 302 being connected to the junction of those resistors.

The application of a positive potential at the control grid of thyratron 302 will cause that thyratron to fire to operate relay CR20 which may be provided with contacts to energize a signal light and, if desired, to shut down the operation of the machine, as above discussed in connection with others of the described circuits.

The oscillatory circuit including elements 258' and coil 30b' is connected in parallel with the oscillatory circuit including elements 254' with respect to the power supply leads 290 and 292 and with respect to the signal output leads 296 and 292, as are the elements of additional oscillatory circuits such as oscillatory circuit 314. Consequently, if in any sensing period the cutting tool associated with any one of the oscillatory circuits is broken, is too short, or is missing, a direct voltage will be applied to the control grid of thyratron 302 to operate relay CR20.

It is presently preferred to rectify the alternating current signal at the oscillator so that the control signals transmitted over conductor 296 are direct voltages, and the rectifying diodes individual to the several oscillatory circuits serve to isolate those circuits from one another. Other means for isolating the circuits may, of course, be provided. It is also contemplated that alternating voltage signals may be transmitted, in which event some means, such as isolating resistors, should be provided for effectively isolating the several oscillatory circuits from one another.

The circuit of FIG. 8 is based upon the assumption that no cutting tool associated with any of the sensing coils will ever leave sensing relationship with those coils as long as the cutting tool is present, of proper length, and unbroken. If it is desired to utilize a system of the nature of FIG. 8 with a machine tool in which, for any of various considerations, it is advantageous to have the cutting tools leave their respective sensing coils during the course of the movement of the head of the machine, and if it is feasible to arrange the machine so that all proper length unbroken cutting tools leave their respective sensing coils (or enter them) at the same time, then the system of FIG. 8 may be modified to so function in any of a number of ways such as by using a coincidence circuit such as that above discussed in connection with FIG. 3 of the drawings. That is, a limit switch would be provided for sensing the position of the head 12 at which the cutting tools just enter or just leave their respective sensing coils and this limit switch would control a second control grid of thyratron TH or, in FIG. 8, of thyratron 302. Alternatively, the output circuit of FIG. 8 may be employed and the limit switch may be connected in circuit in conductor 296, or in circuit in conductor 290 so that battery 291 will be connected to the oscillatory circuits only during such times as proper length and unbroken cutting tools are in sensing relation with their respective sensing coils. In other words, the oscillatory circuits may be enabled to oscillate at all times, but be incapable of transmitting an output signal except at times appropriate for sensing, or the oscillatory circuits may be disabled to break into oscillation except at times appropriate for sensing.

If it is desired or advantageous to utilize an arrangement in which the cutting tools enter or leave their sensing coils nonconcurrently, then the individual oscillatory circuits must be switched in some fashion. A preferred way of doing this is illustrated in FIG. 9 of the drawings which is, or may be, except for the described modifications, identical to the circuit of FIG. 8. In accordance with the modifications, it is assumed that a limit switch is provided to sense the position of the head 12 at which the corresponding cutting tool just enters sensing relation with the individual sensing coil, similar to the arrangement above discussed in connection with FIGS. 1 and 2. Thus, a limit switch 330 is positioned to be closed just at the instant that a cutting tool enters sensing relation with coil 28b'', a limit switch 332 is positioned to be closed due to the movement of the head just at the instant that a cutting tool of proper length just enters sensing relation with sensing coil 30b''', and a limit switch 334 is positioned to be actuated just at the instant that a cutting tool enters sensing relationship with the sensing coil element of the oscillatory circuit 314'. These limit switches are shown to be connected in series with several conductors 296, that is, in series with the individual D.C. output conductors 296a, 296b and 296c from the several oscillatory circuits. In this fashion, the oscillatory circuits will break into oscillation whenever the cutting tool is out of sensing relation with the sensing coil forming a part of that oscillatory circuit, but no output indication will be transmitted via common output conductor 296' to the control device, such as thyratron 302', unless the associated limit switch is closed. Accordingly, an indication will be transmitted to the control device 302' only if the associated cutting tool is in fact broken, too short, or missing.

It will be perceived that the limit switches 330, 332 and 334 could be connected in the leads 292' or 290' if desired, although the illustrated arrangement is preferred. It will be appreciated that since the impedance of the circuits including the leads 290', 292' and 296' is low and since those conductors transmit direct current, the fact that the distance between the oscillatory circuits and the device 302' may be large or differ from circuit to circuit or the fact that the distance between the oscillatory circuits and the limit switches may be substantial or differ from circuit to circuit in a given installation will not be expected to raise any problems.

The arrangements disclosed in FIGS. 3 and 4 of the drawings have the disadvantage that individual cables must be run from each sensing coil to the control cabinet containing the oscillator tubes. These cables must often be of quite substantial length since it is desirable to locate the control cabinets somewhat remotely from the machine tool in view of a number of considerations including accessibility of the electrical equipment for maintenance and protection of the electrical equipment from the dirt, coolant, and vibration encountered near the machine tool. In a machine tool using a large number of detector coils, the bundle of cables becomes quite large and unwieldly, large conduits are required, and space must be provided for a large number of terminals for interconnecting the cable sections.

Additionally, as previously noted, in view of the differences in the distance between the control cabinet and the several sensing coils, it is necessary either to use an appropriate length of cable for each sensing coil and to individually adjust each oscillator to compensate for the factor of cable length, or equal lengths of cable must be used for all sensing coils, and that length must be determined by the distance between the cabinet and the most remote coil.

The circuits of FIGS. 8 and 9 permit the foregoing problems to be avoided. A single cable (e.g., two conductors and a grounded shield) may be used to connect any number of detector circuits on a head to the control unit located in the control cabinet, and the length of the cable is not critical.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a machine having a plurality of cutting tools for performing a plurality of cutting operations upon a workpiece and a head supporting the cutting tools and movable to move the cutting tools into cutting engagement with the workpiece, means for detecting when the length of any of the cutting tools is improper comprising a plurality of oscillatory circuit means each including an inductance coil individual to one of the cuting tools and disposed adjacent the path of travel of and in sensing relationship with the associated cutting tool, each of said oscillatory circuit means being effective to change a characteristic of its operation in accordance with whether a portion of the associated cutting tool is or is not in sensing relation with the individual inductance coil, and common control means responsive to a change of said characteristic of any one of said oscillatory circuit means indicative that no portion of the associated cutting tool is in sensing relationship with the indvdual inductance coil for producing an output indication.

2. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an inductance coil individual to one of the cutting tools and disposed adjacent the path of travel of the associated cutting tool and in critical sensing relationship with the tip of the associated cutting tool at a preselected position of the head, each of said oscillatory circuit means being effective to change a characteristic of its operation in accordance with whether a portion of the individual cutting tool is or is not in sensing relation with the individual inductance coil at said preselected position of the head, and common control means responsive to a change of said characteristic of any one of said oscillatory circuit means indicative that no portion of the associated cutting tool is in sensing relationship with the individual inductance coil for producing an output indication.

3. The combination of claim 2 in which the preselected position of the head at which the tips of certain of the cutting tools are in critical sensing relationship with their respective inductance coils is different than the preselected position of the head at which the tips of certain others of the cutting tools are in critical sensing relationship with their respective inductance coils.

4. The combination of claim 2 in which all of the cutting tools are in critical sensing relationship with their respective inductance coils at the same preselected position of the head.

5. The combination of claim 4 in which said preselected position of the head is the fully retracted position of the head.

6. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an inductance coil individual to one of the cutting tools and disposed adjacent the path of travel of the associated cutting tool and in critical sensing relationship with the tip of the associated cutting tool at a preselected position of the head, said preselected position of the head being the same for all of the plurality of cutting tools, each of said oscillatory circuit means being effective to change a characteristic of its operation in accordance with whether a portion of the individual cutting tool is or is not in sensing relation with the individual inductance coil at said preselected position of the head, and common control means effective when enabled and responsive to a change of said characteristic of any one of said oscillatory circuit means indicative that no portion of the associated cutting tool is in sensing relationship with the individual inductance coil for producing an output indication, and enabling means for enabling said common control means only when the head has moved to said preselected position.

7. The combination of claim 6 in which said preselected position is between the fully retracted position of the head and a position at which the cutting tools are in cutting engagement with the workpiece.

8. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an inductance coil individual to one of the cutting tools and disposed adjacent the path of travel of the associated cutting tool and in critical sensing relationship with the tip of the associated cutting tool at a preselected position of the head, said preselected position of the head differing among different ones of the cutting tools, each of said oscillatory circuit means being effective to change a characteristic of its operation in accordance with whether a portion of the individual cutting tool is or is not in sensing relation with the individual inductance coil at said preselected position of the head, and common control means connected to all of said plurality of oscillatory circuit means and effective when enabled and responsive to a change of said characteristic of any one of said oscillatory circuit means indicative that no portion of the associated cutting tool is in sensing relationship with the individual inductance coil for producing an output indication, and a plurality of enabling means each including means movable with the head for enabling said common control means each time the head reaches an individual one of said preselected positions.

9. The combination of claim 8 in which at least some of said preselected positions are between the fully retracted position of the head and a position at which the cutting tools are in cutting engagement with the workpiece.

10. The combination of claim 8 further including means effective at each of said preselected positions for disabling all of those of the oscillatory circuit means which are associated with cutting tools which are not in critical sensing relationship with their respective inductance coils at that one of said preselected positions from activating said common control means.

11. The combination of claim 8 further including means individual to each of at least certain of said oscillatory circuit means for enabling that oscillatory circuit means to indicate a change of said characteristic to said common control means only at the one of said preselected positions at which the cutting tool associated therewith is in critical sensing relationship with its individual inductance coil.

12. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an inductance coil individual to one of the cutting tools and disposed adjacent the path of travel of the associated cutting tool and in critical sensing relationship with the tip of the associated cutting tool at a preselected position of the head, said preselected position of the head differing among different ones of the cutting tools, each of said oscillatory circuit means being effective, when enabled, to transmit a signal if no portion of the associated cutting tool is in sensing relation with the individual inductance coil, means individual to each of said oscillatory circuit means for enabling the associated oscillatory circuit means to transmit a signal only at the preselected position of the head at which the associated cutting tool is in critical sensing relationship with the inductance coil individual thereto, and common control means responsive to said signal from any one of said oscillatory circuit means for producing an output indication.

13. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an amplifier means and an inductance coil, each of said inductance coils being individual to one of the cutting tools and disposed adjacent the path of travel of and in sensing relationship with the associated cutting tool, each of said amplifier means being disposed proximate the head, each of said oscillatory circuit means being effective to change a characteristic of its operation in accordance with whether a portion of the individual cutting tool is or is not in sensing relation with the individual inductance coil, and common control means disposed remotely from the head and responsive to a change of said characteristic of any one of said oscillatory circuit means for producing an output indication.

14. The combination of claim 13 in which each of said amplifier means includes a transistor.

15. The combination of claim 13 further including bushing plate means positioned between the head and the workpiece and having apertures therein for accepting and guiding the cutting tools, and in which each of said amplifier means is supported by said bushing plate means adjacent the aperture therein which is individual to the associated cutting tool.

16. The combination of claim 13 in which each of said oscillatory circuit means produces an alternating current signal indicative that no portion of the associated cutting tool is in sensing relation with the individual inductance coil at the time that sensing occurs, in which each of said oscillatory circuit means further includes rectifier means for producing a direct current signal from said alternating current signal and in which the direct current signals from all of said oscillatory circuit means are applied to said common control means.

17. The combination of claim 16 further including a conductive path common to all of said oscillatory circuit means for conducting said direct current signals to said common control means.

18. The combination of claim 16 in which said common control means includes a source of energizing potential for all of said oscillatory circuit means, and further including a conductive path common to all of said oscillatory circuit means for applying an energizing potential from said source to all of said oscillatory circuit means.

19. The combination of claim 18 further including another conductive path common to all of said oscillatory circuit means for conducting said direct current signal to said common control means.

20. In a machine having a cutting tool for performing a cutting operation upon a workpiece and a head supporting the cutting tool and movable to move the cutting tool towards and into cutting engagement with the workpiece, means for detecting when the length of the cutting tool is improper comprising oscillatory circuit means including amplifier means and an inductance coil, said inductance coil being disposed adjacent the path of travel of and in sensing relationship with the cutting tool, said amplifier means being disposed proximate the head and proximate said inductance coil, said oscillatory circuit means being effective to change a characteristic of its operation in accordance with whether a portion of the cutting tool is or is not in sensing relation with said inductance coil, and control means disposed remotely from the head and remotely from said oscillatory circuit means and responsive to said change of said characteristic for producing an output indication.

21. The combination of claim 20 in which said oscillatory circuit means produces an alternating current signal as an indication that no portion of the sensing tool is in sensing relationship with the inductance coil at the time that sensing occurs and in which said circuit means further includes rectifying means for producing a direct current signal from said alternating current signal, and in which connecting means are provided for transmitting said direct current signal to said remotely disposed control means.

22. The combination of claim 20 in which said amplifier means includes a transistor.

23. The combination of claim 20 further including bushing plate means positioned between the head and the workpiece and having an aperture therein for accepting and guiding the cutting tool, and in which said inductance coil is supported by said bushing plate means adjacent the aperture therein.

24. The combination of claim 23 in which said amplifier means is disposed in a cavity in said bushing plate means.

25. The combination of claim 23 in which said amplifier means is supported by said bushing plate means.

26. The combination of claim 25 in which said inductance coil is supported by said bushing plate in surrounding relation to the aperture therein.

27. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including amplifier means and an inductance coil, each of said inductance coils being individual to one of the cutting tools and disposed adjacent the path of travel of the associated cutting tool and in critical sensing relationship with the tip of the associated cutting tool at a preselected position of the head, said preselected position of the head differing among different ones of the cutting tools, each of said amplifier means being disposed proximate the head, each of said oscillatory circuit means being effective, when enabled, to transmit a preselected signal if no portion of the associated cutting tool is in sensing relation with the individual inductance coil, common control means disposed remotely from the head responsive to said preselected signal from any one of said oscillatory circuit means for producing an output indication, and enabling means including means movable with the head for enabling the individual ones of said oscillatory circuit means at the appropriate individual preselected positions of the head.

28. The combination of claim 27 in which said common control means includes a common source of energizing potential for said amplifier means, in which common conductive means are provided for applying said energizing potential to all of said amplifier means and in which said enabling means controls the connection of said common conductive means to the individual said amplifier means.

29. The combination of claim 28 in which said enabling means comprises a plurality of elements each of which detects one of said preselected positions of the head.

30. The combination of claim 27 in which common conductive means are provided for transmitting said preselected signals from all of said oscillatory circuit means to said remotely disposed common control means and in which said enabling means controls the connection of said oscillatory circuit means to said common conductive means.

31. The combination of claim 30 in which said enabling means comprises a plurality of elements each of which detects one of said preselected positions of the head.

32. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including an amplifier means and an inductance coil, each of said inductance coils being individual to one of the cutting tools and disposed adjacent the path of travel of and in sensing relationship with the associated cutting tool, each of said amplifier means being disposed proximate the head, each of said oscillatory circuit means being effective to change a characteristic of its operation in accordance with whether a portion of the individual cutting tool is or is not in sensing relation with the individual inductance coil, and comon control means responsive to a change of said characteristic of any one of said oscillatory circuit means for producing an output indication.

33. The combination of claim 32 further including bushing plate means positioned between the head and the workpiece and having apertures therein for accepting and guiding the cutting tools, and in which each of said amplifier means is supported by said bushing plate means proximate the aperture therein which is individual to the associated cutting tool.

34. In a machine having a cutting tool for performing a cutting operation upon a workpiece and a head supporting the cutting tool and movable to move the cutting tool towards and into cutting engagement with the workpiece, means for detecting when the length of the cutting tool is improper comprising oscillatory circuit means including amplifier means and an inductance coil, said inductance coil being disposed adjacent the path of travel of and in sensing relationship with the cutting tool, said amplifier means being disposed proximate the head and proximate said inductance coil, said oscillatory circuit means being effective to change a characteristic of its operation in accordance wtih whether a portion of the cutting tool is or is not in sensing relation with said inductance coil, and control means responsive to said change of said characteristic for producing an output indication.

35. The combination of claim 34 further including bushing plate means positioned between the head and the workpiece having an aperture therein for accepting and guiding the cutting tool, in which said inductance coil is supported by said bushing plate in surrounding relation to the aperture therein, and in which amplifier means is supported by said bushing plate means.

36. In a machine having a plurality of cutting tools for performing a plurality of cutting operations upon a workpiece and a head supporting the cutting tools and movable to concurrently move the cutting tools towards and into cutting engagement with the workpiece, means for detecting when the length of any of the cutting tools is improper comprising a plurality of oscillatory circuit means each including amplifier means and an inductance coil, each of said inductance coils being individual to one of the cutting tools and disposed adjacent the path of travel of the associated cutting tool and in critical sensing relationship with the tip of the associated cutting tool at a preselected position of the head, said preselected position of the head differing among different ones of the cutting tools, each of said amplifier means being disposed proximate the head, each of said oscillatory circuit means being effective, when enabled, to transmit a preselected signal if no portion of the associated cutting tool is in sensing relation with the individual inductance coil, common control means responsive to said preselected signal from any one of said oscillatory circuit means for producing an output indication, and enabling means including means movable with the head for enabling the individual ones of said oscillatory circuit means at the appropriate individual preselected positions of the head.

37. The combination of claim 36 in which said enabling means includes switch means for controlling the effectiveness of the signal lead between said oscillatory circuit means and said common control means.

38. The combination of claim 36 in which said enabling means includes means individual to said oscillatory circuit means for disabling said oscillatory circuit means to change between oscillatory and non-oscillatory conditions except at said appropriate individual preselected positions of the head.

39. The combination of claim 38 in which said means for disabling said oscillatory circuit means comprises a plurality of inductance coils connected respectively to the sensing inductance coils.

40. In a machine having a plurality of cutting tools for performing a plurality of cutting operations upon a workpiece and a head supporting the cutting tools and movable to move the cutting tools into cutting engagement with the workpiece, means for detecting when the length of any of the cutting tools is improper comprising a plurality of electrical circuit means each including an inductance coil individual to one of the cutting tools and disposed adjacent the path of the travel of and in sensing relationship with the associated cutting tool, each of said circuit means being effective to change a characteristic of its operation in accordance with whether a portion of the associated cutting tool is or is not in sensing relation with the individual inductance coil, and common control means responsive to a change of said characteristics of any one of said circuit means indicative that no portion of the associated cutting tool is in sensing relationship with the individual inductance coil for producing an output indication.

41. In a machine having a cutting tool for performing a cutting operation upon a workpiece and a head supporting the cutting tool and movable to move the cutting tool towards and into cutting engagement with the workpiece, means for detecting when the length of the cutting tool is improper comprising electrical circuit means including amplifier means and an inductance coil, said inductance coil being disposed adjacent the path of travel of and in sensing relationship with the cutting tool, said amplifier means being disposed proximate the head and proximate said inductance coil, said circuit means being effective to change a characteristic of its operation in accordance with whether a portion of the cutting tool is or is not in sensing relation with said inductance coil, and control means responsive to said change of said characteristic for providing an output indication.

References Cited in the file of this patent

UNITED STATES PATENTS 2,807,720  Charles _________________ Sept. 24, 1957

OTHER REFERENCES

Clar, German application 1,033,991, printed July 10, 1958 (Kl. 49a55/01), 2 pp. spec., 1 sht. dwg.